(No Model.)

W. HAYTON.
COLLAR FASTENER.

No. 279,751. Patented June 19, 1883.

Witnesses:
Wm. S. Duvall
H. L. Bernhard

Inventor:
William Hayton
per Edson Bros,
attys

UNITED STATES PATENT OFFICE.

WILLIAM HAYTON, OF CANANDAIGUA, NEW YORK.

COLLAR-FASTENER.

SPECIFICATION forming part of Letters Patent No. 279,751, dated June 19, 1883.

Application filed April 21, 1883. (No model.)

*To all whom it may concern:*

Be it known that I, WILLIAM HAYTON, a citizen of the United States, residing at Canandaigua, in the county of Ontario and State of New York, have invented certain new and useful Improvements in Collar-Fasteners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to fastenings for horse-collars, the object being to provide means for easily and quickly securing the open ends of the collar after it has been passed over the neck and to permit of ready detachment of the same in order to remove it; and it consists in the construction and combination of parts, as hereinafter more fully described, and particularly pointed out in the claim.

Figure 1:
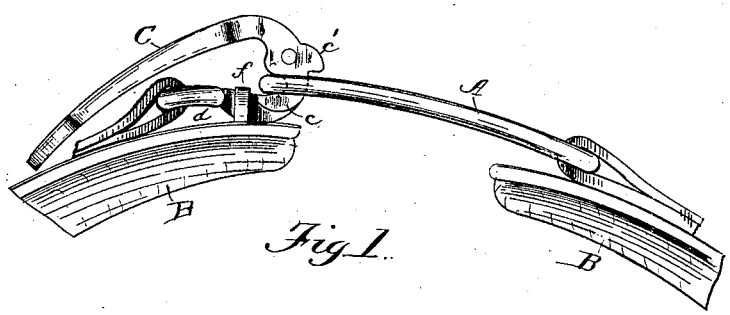
Figure 2:
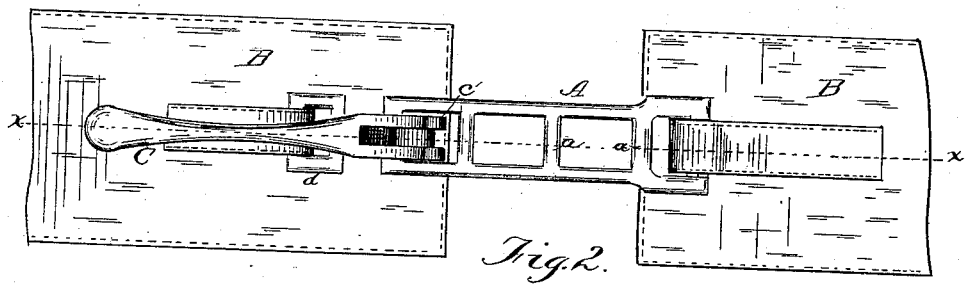
Figure 3:
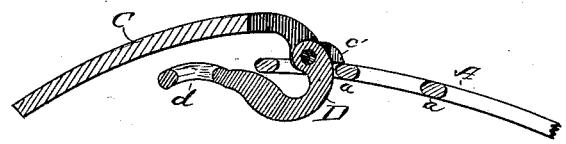

In the accompanying drawings, in which like letters of reference indicate like parts in the several figures, Figure 1 is a side elevation, showing the ends of the collar coupled together. Fig. 2 is a top plan view of Fig. 1. Fig. 3 is a longitudinal section taken on the line *x x*.

In the accompanying drawings, A is a frame having any desired number of cross-bars *a*, and is attached to one end of the collar B by means of a strap sewed or riveted thereto. C is a lever pivoted to a solid hook, D, the latter having an eye, *d*, through which passes a strap, the latter being sewed, riveted, or otherwise secured to the collar B. The hook D is rigidly secured to the collar by means of a strap or band, *f*, which passes over the shank of the hook, and is suitably secured to the collar. The lever C has hooks *c* and cams *c'*. The object of cams *c'* is to prevent the lever from being thrown up and the fastening detached by the end of the frame A being thrown against said lever by some pressure or force acting upon the sides of the collar or hame, in which event these cams would strike upon one of the cross-bars *a*, and thereby prevent the outer end of the frame striking against the under side of the lever, and perhaps throwing it up sufficiently to uncouple the fastening. My coupling, being in bow form, rises somewhat above the horse's neck, avoiding galling or soreness thereof.

The operation of my device is as follows: When the ends of the collar have been passed over the neck, the end of lever C is passed around one of the cross-bars, having regard to the size of the horse's neck, when the free end is drawn down in juxtaposition with the collar, whereby the cross-bar *a* is made to engage with the solid hook D. To unfasten the coupling it is only necessary to raise the lever C, which will raise the cross-bar *a* over the solid hook D, allowing the ends of the collar to be separated.

Modifications in the form and size can be made without departing from the spirit or sacrificing the advantages of my invention—as, for instance, the lever may have a single hook and the solid hook may be divided.

I am aware that in hame-fasteners a hooked lever having an elongated curved slot to receive the axis of the lever, whereby a notch in the hook of the lever can be withdrawn from or caused to engage with one of the cross-bars of a frame, is not new.

Having thus described my invention, what I claim is—

A frame having one or more cross-bars attached to one end of a divided collar, in combination with a hooked lever having cams and a solid hook attached to the other end of a collar, said cam adapted to strike against one of the cross-bars of the frame, as shown and described.

In testimony whereof I affix my signature in presence of two witnesses.

WILLIAM HAYTON.

Witnesses:
H. I. BERNHARD,
JOS. R. EDSON.